United States Patent
Masson et al.

(10) Patent No.: US 10,636,053 B2
(45) Date of Patent: Apr. 28, 2020

(54) EVALUATING CONTENT PUBLISHER OPTIONS AGAINST BENCHMARK PUBLISHER

(71) Applicant: Facebook, Inc., Menlo Park, CA (US)

(72) Inventors: Robert Daniel Paul Masson, Seattle, WA (US); David McCafferty Lapayowker, Seattle, WA (US); Joshua Ryan Williams, Seattle, WA (US); Kevin Donald Kelly, Bainbridge Island, WA (US)

(73) Assignee: Facebook, Inc., Menlo Park, CA (US)

( * ) Notice: Subject to any disclaimer, the term of this patent is extended or adjusted under 35 U.S.C. 154(b) by 234 days.

(21) Appl. No.: 15/610,147

(22) Filed: May 31, 2017

(65) Prior Publication Data

US 2018/0349944 A1    Dec. 6, 2018

(51) Int. Cl.
*G06Q 30/02* (2012.01)
*G06Q 30/06* (2012.01)
*G06F 16/95* (2019.01)

(52) U.S. Cl.
CPC ......... *G06Q 30/0242* (2013.01); *G06F 16/95* (2019.01); *G06Q 30/0243* (2013.01); *G06Q 30/0244* (2013.01); *G06Q 30/0245* (2013.01); *G06Q 30/0254* (2013.01); *G06Q 30/0277* (2013.01); *G06Q 30/0613* (2013.01)

(58) Field of Classification Search
USPC ............ 705/14.6, 14.42, 14.41, 14.43, 14.71
See application file for complete search history.

(56) References Cited

U.S. PATENT DOCUMENTS

| | | | | |
|---|---|---|---|---|
| 8,433,603 | B1* | 4/2013 | Shon | G06Q 10/063 705/7.35 |
| 9,882,886 | B1* | 1/2018 | Kowshik | H04L 63/08 |
| 2006/0173743 | A1* | 8/2006 | Bollay | G06Q 30/02 705/14.41 |
| 2008/0154717 | A1* | 6/2008 | Saifee | G06Q 30/02 705/14.6 |
| 2011/0320261 | A1* | 12/2011 | Kadambi | G06Q 30/02 705/14.42 |
| 2014/0046966 | A1* | 2/2014 | Jensen | G06Q 30/0241 707/754 |
| 2017/0262878 | A1* | 9/2017 | Cetintas | G06Q 30/0244 |

* cited by examiner

*Primary Examiner* — Kiersten V Summers
(74) *Attorney, Agent, or Firm* — Fenwick & West LLP (57) ABSTRACT

An online system evaluates the quality of a content publisher displaying sponsored content items. To determine a likelihood of conversion actions associated with the sponsored content items, the online system uses information about users and their interactions with sponsored content items featured within the content publisher against interactions with sponsored content items featured within a benchmark system (e.g., online system). By determining a ratio of these interactions, the online system can determine a likelihood of conversion actions for the content publisher. The online system uses this likelihood of conversions to determine a publisher quality score that it uses to normalize third party value contributions toward placing sponsored content items on the content publisher. Thus, third party systems no longer need to be concerned about the intrinsic value of a given content publisher as third party value contributions are normalized based on the content publisher's conversion rates.

20 Claims, 6 Drawing Sheets

For Sponsored Content Items Provided on Content Publisher & Benchmark Publisher

Fig. 5A

For Sponsored Content Items Provided on Content Publisher & Benchmark Publisher

EVALUATING CONTENT PUBLISHER OPTIONS AGAINST BENCHMARK PUBLISHER

BACKGROUND

This invention relates generally to evaluating the quality of a content publisher, and particularly to evaluating the likelihood of a group of users interacting with content items featured on the content publisher.

Publishers provide content for users to consume in an interactive system. Such interactive systems may be websites, games, applications, or other electronic interactive systems of interest to a user. When providing the content to users, a publisher may develop a layout or other interactive flow in which the user interacts with the publisher. Within the layout, the publisher may provide a slot for content selected by another system or for placement of sponsored content provided by a third party system. Content is selected based on a bidding process in which third party systems provide a value contribution in exchange for placing their sponsored content within the slot provided by the publisher.

Third party value contribution is based on criteria associated with a particular sponsored content campaign initiated by a third party. Typically, the criteria indicate parameters such as targeting criteria, sponsored content type, slot type, value contribution amount, and the like. A given sponsored content campaign is selected when the criteria match with that specified by the publisher. Typically a user's interaction with the content placed in a slot is beneficial for the publisher, for example to encourage the user to take a behavior related to the content selected for the slot. The behavior may directly or indirectly benefit the publisher. However, third parties providing the content typically have lacked the tools to evaluate the quality of the publisher on which their content is placed. Rather, one value contribution amount is applied across all publishers that feature slots in which content will be placed, regardless of the amount of user traffic a publisher generates or the likelihood that a user will interact with the content.

SUMMARY

An online system evaluates the quality of a given publisher containing content slots. The quality of the publisher can be evaluated by assessing the likelihood of users visiting the publisher to interact with, or otherwise engage, content items featured in slots within one or more pages of the publisher. Each content item is associated with a conversion action representing the desired behavior of a user after being presented with the content item. Thus, a conversion action is an objective of the content, and may be the user clicking on or interacting with the content or may be a user installing a program or application related to the content, exploring products available for purchase and so forth. To evaluate the quality of the publisher, the likelihood that a user will interact with content featured on the publisher and on the online system is identified to determine the ratio of user interactions at the publisher and a benchmark. Thus, a given publisher may present content with a conversion ratio of 110% or 90% of the conversion rate relative to the content when presented in the benchmark, for example.

Across different publishers, these conversion ratios may vary. To determine the likelihood of conversions within a given publisher, the online system uses information about users and their interactions with third party content featured within different publishers against interactions with third party content featured within a benchmark publisher (e.g., online system). By determining a ratio of user interactions with third party content featured within the publisher against those user interactions within the benchmark publisher, the online system can determine a likelihood of conversions for that given publisher. The online system uses this likelihood of conversions to determine a publisher quality score that it uses to normalize third party value contributions toward placing sponsored content on that given publisher. Thus, disparities in the intrinsic value across publishers are diminished as third party value contributions are normalized based on the publisher conversion rates. This normalization may be based on a publisher quality score.

The publisher quality score may be unreliable when there is insufficient data about the publisher's actual conversion rates and the data is sparse, for example because there have not been many impressions at the publisher. To improve measurement of the publisher quality score, an audience score and a purchase score are determined and combined. The audience score reflects the audience of users that visit the publisher and reflects that audience's conversion rate at the benchmark. The purchase score reflects the likelihood of the conversion action at the publisher compared to the benchmark. Thus, the audience score may provide an effective measure for the publisher even when there has been a small number of impressions at the publisher, and the combination between the audience score may weigh the purchase score more heavily as additional activity is available for the publisher. In this way, the publisher may still be effectively evaluated even when there are few impressions at the publisher's system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Figure 1:
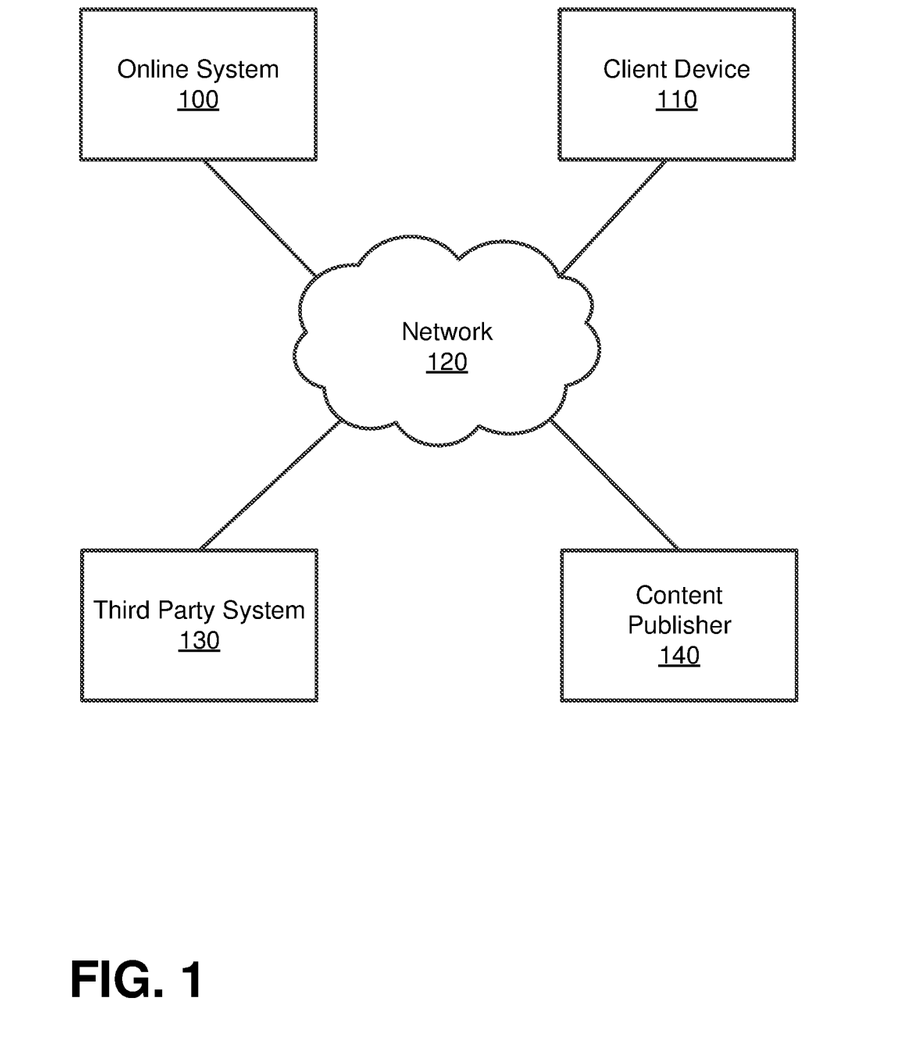
FIG. 1 is a block diagram of a system environment for evaluating content publisher options against a benchmark publisher.

FIG. 1 is a block diagram of a system environment for generating publisher quality scores for content publishers. The system environment includes an online system 100, a client device 110, a network 120, a third party system 130, and a content publisher 140. In other embodiments, different and/or additional entities can be included in the system architecture. The online system 100 provides content items, such as sponsored content items, to users of the client devices 110 to access the content publisher 140 or an application controlled by the content publisher 140. Sponsored content items are also provided to users by other publishing platforms, one of which may be considered a benchmark for the sponsored content item. The online system 100 evaluates performance of the content items in slots featured on the content publisher 140 in comparison to the benchmark publishing platform to determine the comparative performance of the content publisher's 140 slots in promoting the content items and associated interactions with the content items. As the evaluation may be performed with respect to subsets of online system 100 users, the online system 100 may use the behavior of users (e.g., interaction with content slots) within a given content publisher 140 to adjust the value a third party system 130 might contribute toward placing content items within that content publisher 140. In addition, the comparative performance of a content publisher 140 may also reflect poor representation of content items featured on the content publisher 140, and the online system 100 may also use the comparative scores to modify what content items may be presented on the content publisher 140.

The online system 100 includes a computing environment that allows users of the online system 100 to communicate or otherwise interact with each other and access content. The online system 100 stores information about the users, for example, user profile information and information about actions performed by users on the online system 100. The online system 100 maintains content items for presentation to users via publication platforms, such as the content publisher 140 or via another publication channel, which may be operated by the online system 100. When an available slot is identified, the online system selects a content item for presentation in the available slot from various content items that may be presented to users. As users interact with the content publisher 140 (or an application provided by the content publisher), the online system 100 provides content items for available slots. The selected content items may be provided by third party systems 130 and may include a value to a third party system 130 when an action is performed by a user responsive to the selection of the content item. The online system 100 may select from among these content items based on the value associated with each content item provided.

The online system 100 selects sponsored content items to be presented to an online system 100 user. The selected content may be provided to the user when the user accesses the online system 100, for example to view content of the online system 100, or may be provided to the user when the user accesses the content publisher 140 or interacts with a content publisher's application. When the online system 100 or a content publisher 140 (or the content publisher's application on the device) has a location (or slot) in which sponsored content may be placed by the online system 100, the online system 100 receives a request to select content for the location and provides the selected content item for display in that location. In one embodiment, the online system 100 selects sponsored content items from the available sponsored content campaigns stored in a content store. In other embodiments, the online system 100 selects sponsored content items from available sponsored content campaigns stored in another system, external to the online system 100. The online system 100 examines criteria associated with each sponsored content campaign and selects one or more sponsored content items for presentation to the user. To select the sponsored content, for example, the online system 100 identifies sponsored content campaigns that target a particular user, and perform an auction for placement in the slot based on the expected value of each sponsored content item for placement in the slot.

The client device 110 is a computing device capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 100. For example, a client device 110 executes a browser application to enable interaction between the client device 110 and the online system 100 via the network 120. In another embodiment, a client device 110 interacts with the online system 100 through an application programming interface (API) running on a native operating system of the client device 110, such as IOS® or ANDROID™. The client device 110 may interact with the content publisher 140 to view and retrieve content from the content publisher 140. In some embodiments, the client device 110 retrieves and executes an application provided by the content publisher 140. Within the application (or while the client device 110 accesses content at the third party system 130), content slots may be specified for which content is retrieved from the online system 100. The content slots may be located within the content of the content publisher 140 according to a layout specified by the content publisher 140. When content items are retrieved from the online system 100, users may interact with the retrieved content items, for example to access a related page or perform another interaction associated with the selected content item.

One or more third party systems 130 may be coupled to the network 120 for communicating with the online system 100. The third party systems 130 provide content items to the online system 100 for selection and presentation to users of the client devices 110. The content items may describe applications for execution by a client device 110 or other content for a user to interact with. The third party system 130 may provide the content items as sponsored content that encourages a user's action based on placement of the content item to a user, and may also provide a value to the online system and/or content publisher 140 when the content item is provided to the user or when the user performed the designated action. For example, the third party system 130 may provide information about products or services provided by the third party system that may be of interest to users. When users express an interest in or interact with the content, the third party system 130 may provide value to the online system 100 or the content publisher 140 for providing the content to users. Thus, the third party system 130 may represent a company offering a product, service, or message that the company wishes to promote to users of the client devices 110.

The network 120 includes any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 180 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The content publisher 140 provides content accessed by users of the client device 110 and provides slots in which content items selected by the online system 100 are placed. In one embodiment, a content publisher 140 is an application provider that provides an application for execution by a client device 110 or communicating data to client devices 110 for use by an application executing on the client device 110. In other embodiments, a content publisher 140 provides content (e.g., videos, pictures, news stories, and other content) or other information for presentation via a client device 110.

The content publisher 140 features locations within a page layout where one or more content items can be presented to a user from the online system 100. These content items may be sponsored by the third party systems 130 to provide value to the content publisher 140. Sponsored content items can be placed within sponsored content slots arranged vertically or horizontally in different portions of a page layout according to the preferences of a content publisher 140. In one embodiment, locations within a page layout designated for sponsored content items are segmented into a number of sponsored content slots arranged according to the dimensions of the sponsored content items provided by a third party system 130. This sponsored content is selected by the online system 100 for presentation on a client device 110 at a content publisher's 140 page or within a content publisher's 140 application executing on client device 110. The online system 100 may evaluate the quality of a content publisher 140 by determining a publisher quality score.

II. Online System

Figure 2:
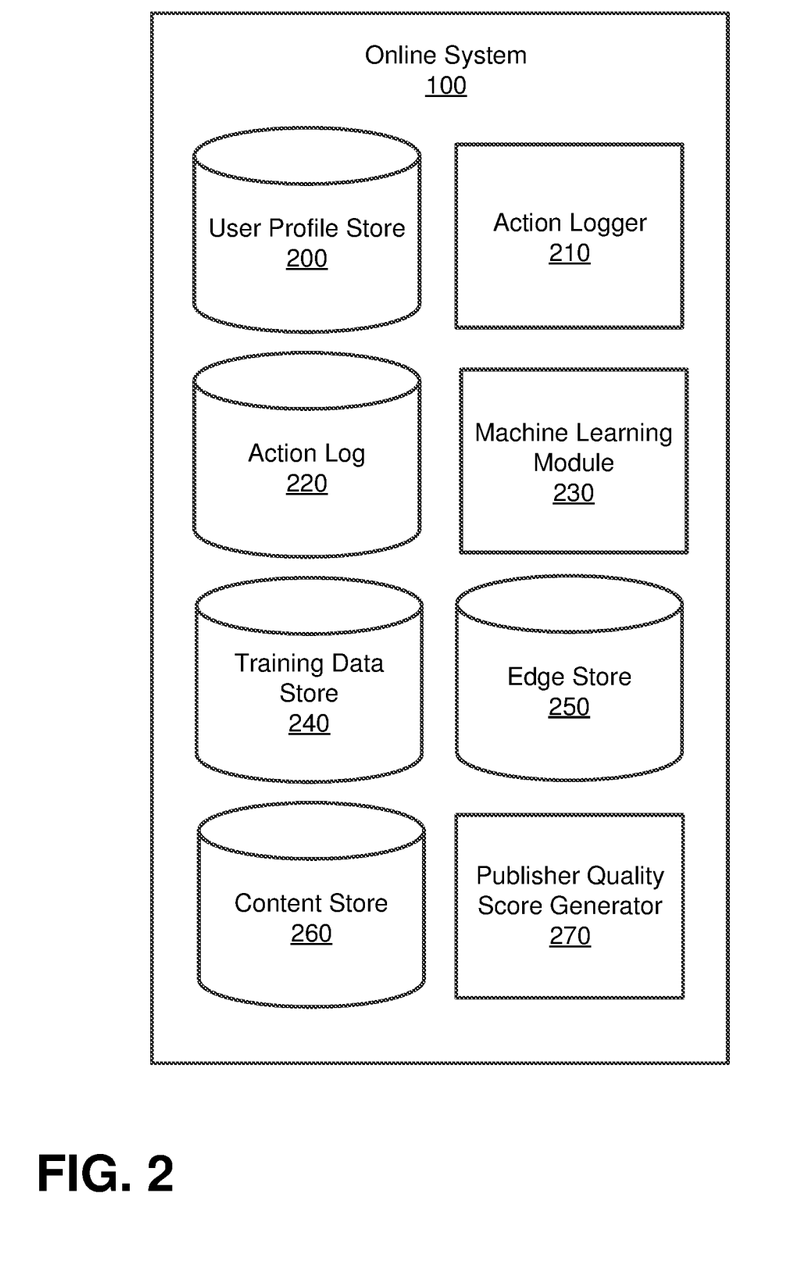
FIG. 2 is a block diagram of an online system having a publisher quality score generator according to one embodiment.

FIG. 2 is a block diagram of an online system 100 with a publisher quality score generator 270 according to one embodiment. In the embodiment illustrated in FIG. 2, the online system 100 includes a user profile store 200, an action logger 210, an action log 220, a machine learning module 230, a training data store 240, an edge store 250, a content store 260, and a publisher quality score generator 270. In other embodiments, the online system 100 may include additional, fewer, or different components for various applications. Conventional components such as network interfaces, security functions, load balancers, failover servers, management and network operations consoles, and the like are not shown so as to not obscure the details of the system architecture.

Each user of the online system 100 is associated with a user profile, which is stored in the user profile store 200. A user profile includes declarative information about the user that was explicitly shared by the user and may also include profile information inferred by the online system 100. In one embodiment, a user profile store 200 of an online system user includes multiple data fields, each describing one or more attributes of the user. Examples of information stored in a user profile store 200 include biographic, demographic, and other types of descriptive information, such as work experience, educational history, gender, hobbies or preferences, location and the like. A user profile may also store other information provided by the user, for example, images or videos. In certain embodiments, an image of a user may be tagged with information identifying the online system user displayed in an image. A user profile in the user profile store 200 may also maintain references to actions by the corresponding user performed on content items in the action log 220.

While user profiles in the user profile store 200 are frequently associated with individuals, allowing individuals to interact with each other via the online system 100, user profiles may also be stored for entities such as businesses or organizations. This allows an entity to establish a presence on the online system 100 for connecting and exchanging content with other online system 100 users. The entity may post information about itself, about its products or provide other information to users of the online system 100 using a brand page associated with the entity's user profile. Other users of the online system 100 may connect to the brand page to receive information posted to the brand page or to receive information from the brand page. A user profile associated with the brand page may include information about the entity itself, providing users with background or informational data about the entity.

The action logger 210 receives communications about user actions internal to and/or external to the online system 100, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 100 to track user actions on the online system 100, as well as actions on third party systems 130 that communicate information to the online system 100. Users may interact with various objects on the online system 100, and information describing these interactions is stored in the action log 220. Examples of interactions with objects include: viewing videos, commenting on posts, sharing links, checking-in to physical locations via a mobile device, accessing content items, and any other suitable interactions. Additional examples of interactions with objects on the online system 100 that are included in the action log 220 include: viewing videos posted by a user's connections in the online system 100, commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with sponsored content on the online system 100 as well as with other applications operating on the online system 100. In some embodiments, data from the action log 220 is used to infer interests or preferences of a user, augmenting the interests included in the user's user profile store 200 and allowing a more complete understanding of user preferences.

In one embodiment, the edge store 250 stores information describing connections between users and other objects on the online system 100 as edges. Some edges may be defined by users, allowing users to specify their relationships with other users. For example, users may generate edges with other users that parallel the users' real-life relationships, such as friends, co-workers, partners, and so forth. In one embodiment, the user profile store 200 stores data describing the connections between different users of the online system 100, such as the number of friends shared between the users out of the total number of friends, the fraction of time since joining or becoming a member of the social networking system that overlaps between the two users (e.g., whether the users joined the online system at the same time or have an overlap for a certain period of time), or a combination of these signals. The record of users and their connections in the online system 100 may be called a "social graph."

Other edges are generated when users interact with objects in the online system 100, such as expressing interest in a page on the online system 100, sharing a link with other users of the online system 100, viewing videos posted by other users of the online system 100, and commenting on posts or videos provided by other users of the online system 100. The connections between users and other objects, or edges, can be unidirectional (e.g., a user following another user) or bidirectional (e.g., a user is a friend with another user).

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 100, or information describing demographic information about a user. Each feature may be associated with a source object or user, a target object or user, and a feature value. A feature may be specified as an expression based on values describing the source object or user, the target object or user, or interactions between the source object or user and target object or user. Hence, an edge may be represented as one or more feature expressions.

The edge store 250 also stores information about edges, such as affinity scores for objects, interests, and other users. In one embodiment, affinity scores, or "affinities," are computed by the online system 100 over time to approximate a user's interest in an object or another user in the online system 100 based on the actions performed by the user. A user's affinity may be computed by the online system 100 over time to approximate a user's affinity for an object, interest, and other users in the online system 100 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 250, in one embodiment. Alternatively, each interaction between a user and a specific object is stored as a separate edge.

The content store 260 stores objects that represent various types of content. Examples of content represented by an object include a video, page post, status update, photograph, link, shared content item, gaming application achievement, check-in event at a local business, brand page, or any other type of content. Online system 100 users may create objects stored by the content store 260, such as status updates, photos tagged by users to be associated with other objects in the online system 100, events, groups, or applications. In some embodiments, objects are received from third party systems 130 and placed in the content store 260. These objects may represent sponsored content campaigns provided by one or more third party systems 130.

Each sponsored content campaign affiliated with a third party system 130 contains criteria regarding how it is to be implemented by the online system 100. In one embodiment, criteria affiliated with sponsored content campaigns are stored with the sponsored content in the content store 260 in the online system 100. In other embodiments, these criteria may be stored in a separate system to be used by the online system 100 when needed. Sponsored content campaign criteria specify a third party value contribution and a desired action to be performed by the user.

The third party value contribution is associated with sponsored content provided by a third party system 130 and specifies an amount of compensation the third party system 130 provides the online system 100 if the sponsored content is presented to a user or accessed by a user. In one embodiment, the third party value contribution is used by the online system 100 to determine an expected value, such as monetary compensation, received by the online system 100 for presenting the content to a user, if the content receives a user interaction, or based on any other suitable condition. For example, the third party value contribution specifies a monetary amount that the online system 100 receives from the third party system 130 if the sponsored content item is displayed and the expected value is determined based on the third party value contribution and a probability of a user accessing the displayed content.

The sponsored content may also specify one or more actions performed by a user that is desired by the third party system 130 providing the sponsored content. In this way, the desired action is a measurable objective of the sponsored content. The desired action is termed a conversion or a conversion action. The conversion action may be the user interacting with the content, for example by "clicking" or selecting the content to view a page or other item referenced by the sponsored content. In other examples the conversion action may be downloading or installing an application associated with the sponsored content, while another conversion action may be installing the application and further purchasing or interacting with the application. In other examples, the conversion action may be completing a purchase on a website. These conversion actions may be specified for each sponsored content item provided by the third party system 130.

In other examples, a conversion action for the sponsored content item may be automatically determined based on the type of sponsored content, which may not be the basis on which the online system 100 receives value for presenting the sponsored content. In this example, the online system 100 may identify or determine an objective (e.g., conversion action) for a sponsored content item to reflect the likely desired objective of the sponsored content item. For example, a sponsored content item relating to an installation of an application may be associated with a conversion action for installing the application. As another example, for a sponsored content item relating to an installation of an application that reports application events to the online system 100, the online system 100 may identify a conversion action related to receipt of specified events from the application indicating that a user both installed and interacted with the application. These interactions may include a validation of the application, a purchase event in the application, or an event in the application indicating interaction with the application beyond installing the application. The conversion actions for a sponsored content item may be stored and identified in the action log 220 or the edge store 250.

The machine learning module 230 uses machine learning techniques to train one or more models to predict actions of users of the online system 100. Machine learning techniques include, for example, linear regression, decision trees, support vector machines, classifiers (e.g., a Naive Bayes classifier), and gradient boosting. In one embodiment, the machine learning module 230 takes, as input, user data about a target user (e.g., user profile information of the target user and actions performed by the target user). The machine learning module 230 may also, or as an alternative, receive information regarding a target user's affinity for individual sponsored content items associated with a particular third party system as input (e.g., the target user's favorite brand). Based on the user data and trained models, the machine learning module 230 generates a score indicative of a likelihood that the target user will perform an action responsive to an impression of a content item, such as acquire a related item, for example, from a third party system 130. In another embodiment, the machine learning module 230 generates a score indicative of a likelihood that the target user will execute a transaction associated with the item. For example, if an online system 100 user is presented with sponsored content contained in an app, the machine learning module 230 can generate a score indicating the likelihood of the online system 100 user making a purchase within the app based on user data and trained models. This score is provided to the publisher quality score generator 270 where it is used in determining a publisher quality score.

The publisher quality score generator 270 produces a publisher quality score based on information about a content publisher 140. In one embodiment, this information is provided by the machine learning module 230. In another embodiment, information about a content publisher 140 is derived from user profile stores 200, action logs 220, and/or edge stores 250 of online system 100 users that interacted with the content publisher 140. The online system 100 uses this publisher quality score to normalize disparities in expected value that exist across content publishers 140.

III. Publisher Quality Score Generator

Figure 3A:
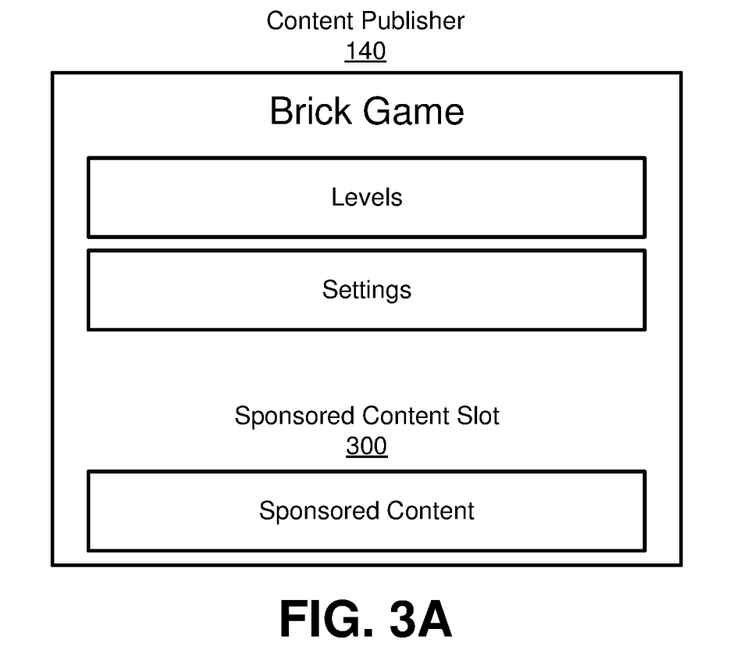
FIG. 3A is a block diagram of an example content publisher according to one embodiment.
Figure 3B:
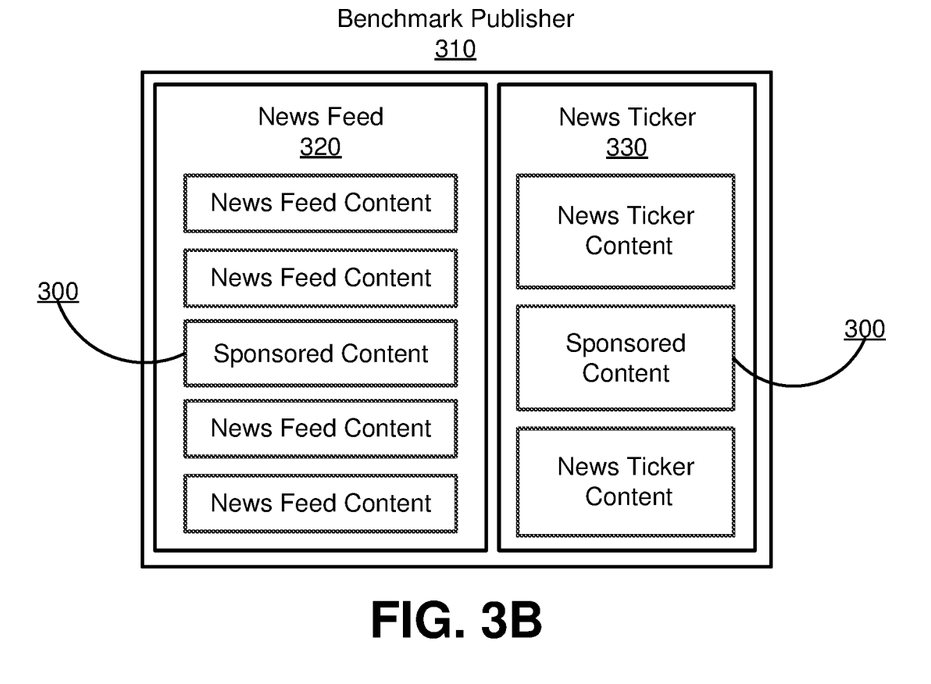
FIG. 3B is a block diagram of a benchmark publisher according to one embodiment.

The publisher quality score generator 270 produces publisher quality scores used to normalize third party value contributions toward sponsored content distributed across content publishers 140 that produce different respective conversion rates. Due to the variety of ways in which sponsored content is presented to users across content publishers 140, there are intrinsically some content publishers 140 that drive more, or less, expected value than others. For example, an app featuring sponsored content slots arranged in a particular configuration, or page layout, might generate a higher conversion rate than another app that features a different page layout or fewer sponsored content slots. FIG. 3A illustrates a content publisher 140, Brick Game, that contains a sponsored content slot 300. FIG. 3B illustrates the same sponsored content slot 300 featured in the news feed 320 of a benchmark publisher 310 (e.g., an online system 100). Although the sponsored content displayed within the sponsored content slots 300 is consistent across publishers, the difference in page layout presented by both publishers can result in different conversion rates.

Due in part to this intrinsic difference, third party systems 130 might experience a lower, or higher, expected value from sponsored content placed across different content publishers 140. This expected value is generally relative to the overall system (e.g., online system 100, other content publishers 140), which can highlight respective disparities in expected value among content publishers 140 and the online system 100. The publisher quality score generator 270 generates a score for each content publisher 140 that reflects the publisher's ability to generate value (e.g., conversion rates). This publisher quality score is used by the online system 100 to normalize third party value contributions toward sponsored content, thus helping to remove disparities in expected value across content publishers 140. The publisher quality score is comprised of three components: an audience score, a purchase score, and their respective weights.

Audience Score

Figure 4:
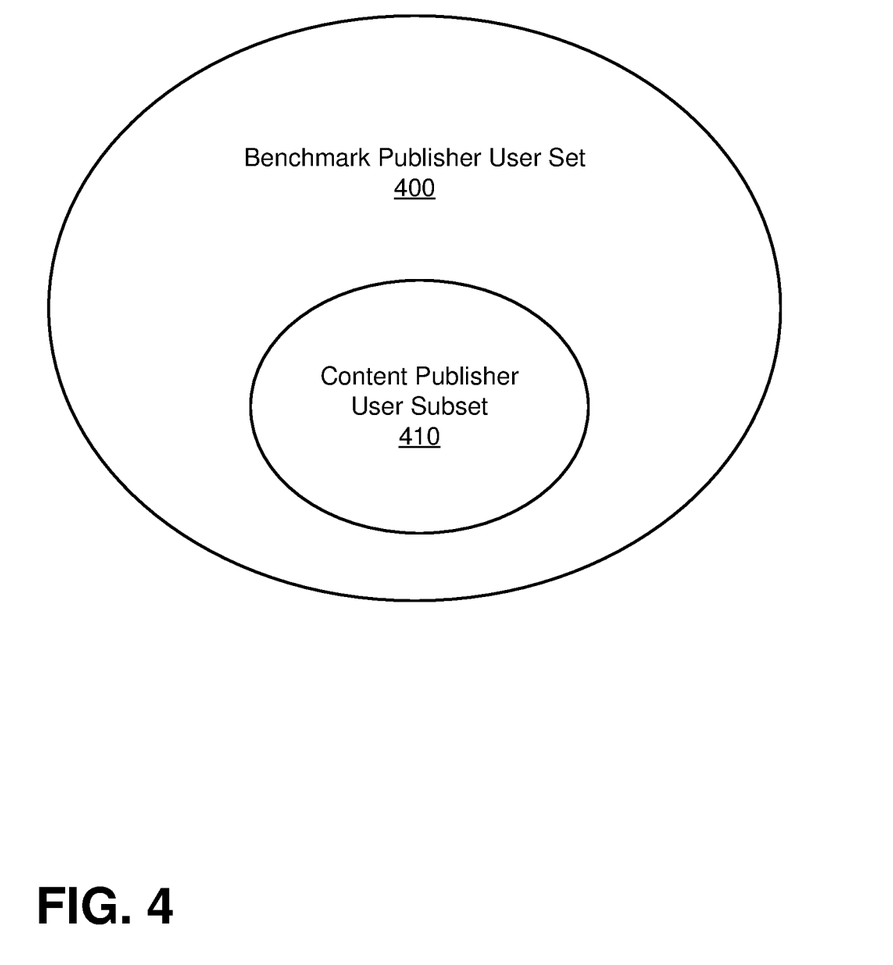
FIG. 4 is a diagram illustrating a benchmark publisher user set and a content publisher user subset according to one embodiment.

An audience score indicates the likelihood that a subset of online system 100 users that visit a given content publisher 140 will engage with sponsored content featured on that content publisher 140 based on previous user behavior (e.g., click, install app, purchase items within app, and the like) exhibited by the subset on a benchmark publisher 310 (e.g., an online system 100). In this way, the audience score describes how behavior of the subset of users of the online system that visit the publisher differ from the users of the online system as a whole on the benchmark publisher 130. This audience score is associated with content publishers 140 that generate less than a threshold volume of user traffic. Because user traffic is below a threshold number of users, the publisher quality score generator 270 has limited data corresponding to online system 100 user behavior within the content publisher 140. Because this data exists in a small quantity relative to other content publishers 140, or does not exist, the publisher quality score generator 270 uses information from user profile stores 200, action logs 220, and/or edge stores 250 to identify the online system 100 users that use the content publisher 140 and to observe their previous behavior while using the benchmark publisher 310. FIG. 4 is a Venn diagram illustrating this content publisher user subset 410 that consists of a portion of the benchmark publisher user set 400. For example, if a content publisher 140 attracts 1,500 online system 100 users, those 1,500 online system 100 users comprise the content publisher user subset 400 of benchmark publisher user set 400, and their user behaviors within the benchmark publisher 310 contribute to the audience score.

Figure 5A:
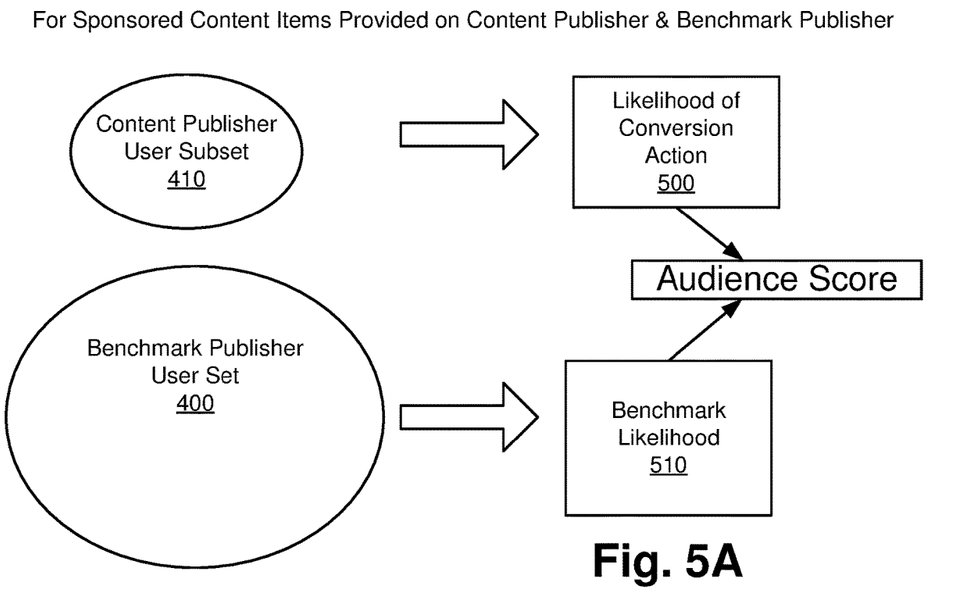
FIG. 5A is a flowchart illustrating an audience score according to one embodiment.

FIG. 5A illustrates the process of producing an audience score according to one embodiment. In this embodiment, the publisher quality score generator 270 can identify users of a content publisher 140 (e.g., a publisher user subset 410) by examining the user profile stores 200 for each online system 100 user that visited the content publisher 140. In one embodiment, the publisher quality score generator 270 provides this information to the machine learning module 230 that identifies actions previously taken by the content publisher user subset 410 within a benchmark publisher 310 (e.g., the online system 100) by using information from the action logs 220 and edge stores 250 of the identified users. The machine learning module 230 can use this information to assess the likelihood of the content publisher user subset 410 interacting with, or otherwise engaging, sponsored content featured on the content publisher 140.

In another embodiment, the publisher quality score generator 270 provides the machine learning module 230 with the identities of each user in the content publisher user subset 410 in addition to individual sponsored content items associated with a particular third party system 130 (e.g., forming a user-ad pair). The machine learning module 230 can use this information to identify a likelihood that a particular sponsored content item will receive a conversion action from a particular user of the content publisher user subset 130 (e.g., user-ad pair results in conversion).

The machine learning module 230 can use information received as input (e.g., user identity or user-ad pair) to determine a score indicating the likelihood of a user installing an application to a client device 110 and interacting with sponsored content items (e.g., clicking, performing conversion actions, making purchases, and the like) within the downloaded application. In another embodiment, this score can be determined by the publisher quality score generator 270 using information about the content publisher user subset 400 collected from their respective user profile stores 200, action logs 220, and/or edge stores 250.

In addition to determining the likelihood of conversion action 500 score for a content publisher user subset 410, the publisher quality score generator 270 can also determine a likelihood for conversion actions associated with the benchmark publisher user set 400. The publisher quality score generator 270 identifies the benchmark publisher user set 400 and generates a score, a benchmark likelihood 510 score, which represents the likelihood of the benchmark publisher user set 400 to perform conversion actions on sponsored content items displayed within the benchmark publisher 310. In one embodiment, this score is based on collected information about the benchmark publisher user set 400 from user profile stores 200, action logs 220, and/or edge stores 250. In another embodiment, this score is generated by the machine learning module 230 based on a likelihood of a conversion action associated with each user of the benchmark publisher user set 400 and each sponsored content item provided by a particular third party system 130 (e.g., user-ad pair).

The publisher quality score generator 270 uses the likelihood of conversion action 500 (dividend) and benchmark likelihood 510 (divisor) scores to form a ratio that yields an audience score (quotient) for a content publisher user subset 410 that use a given content publisher 140:

$$\text{audience score} = \frac{\text{likelihood of conversion action}}{\text{benchmark likelihood}}$$

The publisher quality score generator 270 uses this audience score, in addition to a purchase score and associated weight further discussed below, to normalize third party value contributions toward sponsored content item, thus helping to remove disparities in expected value across content publishers 140.

For example, when online system 100 users A, B, and C visit a content publisher 140, the publisher quality score generator 270 identifies these users (e.g., a content publisher user subset 410) and examines their characteristics to predict interactions with respect to sponsored content items featured on a benchmark publisher 310. The publisher quality score generator 270 combines the likelihoods held by each user A, B, and C into an overall likelihood of conversion actions for this content publisher user subset 410 (e.g., likelihood of conversion action 500 score) to which users A and B contribute greater than user C. In one example, the overall likelihood of conversion actions are determined by identifying the likelihood for the users in the population (e.g., all users or a random sampling within the population) based on a model predicting the likelihood of conversion for users with respect to the advertisement. The likelihood of the users in the population may be averaged or otherwise combined to determine the expected conversion of the population as a whole. The publisher quality score generator 270 also similarly generates a benchmark likelihood 510 score for the benchmark publisher user set 400, which may include many more users than users A, B, and C. The publisher quality score generator 270 uses the likelihood of conversion action 500 score (e.g., describing the likelihood of users A, B, and C on the benchmark publisher interacting with the sponsored content items) as the dividend in a ratio in which the benchmark likelihood 510 score is the divisor. The quotient generated by this ratio is the audience score for the advertisement at the publisher having users A, B, and C.

Purchase Score

A purchase score indicates the likelihood that the benchmark publisher user set 400 will engage with sponsored content items featured on a content publisher 140. The purchase score is based on the rate of conversion actions associated with sponsored content items displayed on the content publisher 140 in comparison to the rate of conversion actions associated with the same sponsored content items displayed on the benchmark publisher 310. Thus, while the audience score may reflect the different audience of a publisher, if that audience views the advertisement at the benchmark, the purchase score may assess the likelihood of conversion difference for the same audience across the benchmark publisher and the content publisher. For example, if the content publisher 140 in FIG. 3A, Brick Game, has garnered a threshold volume of user traffic, the publisher quality score generator 270 can observe conversion actions associated with a sponsored content item displayed on the content publisher 140, such as that featured in sponsored content slot 300. The publisher quality score generator 270 can compare the rate of these conversion actions to the rate of conversion actions associated with the same sponsored content item displayed on the benchmark publisher 310, such as that featured in the news feed 320 or the news ticker 330 in FIG. 3B. The publisher quality score generator 270 can use this comparison to determine which location (e.g., content publisher 140 or benchmark publisher 310) yields a greater rate of conversion actions associated with the sponsored content item.

Figure 5B:
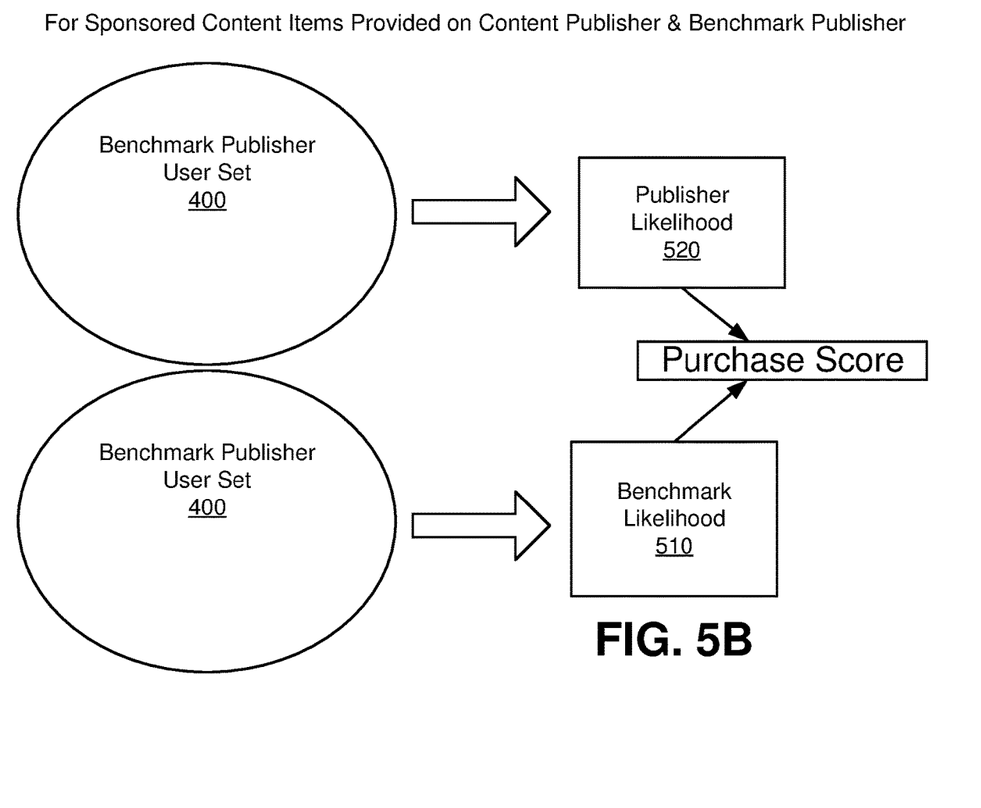
FIG. 5B is a flowchart illustrating a purchase score according to one embodiment.

FIG. 5B illustrates a process for determining a purchase score, according to one embodiment. In the embodiment illustrated in FIG. 5B, the publisher quality score generator 270 identifies a set of sponsored content items presented on, both, a content publisher 140 and the benchmark publisher 310. The publisher quality score generator 270 monitors the rate of conversion actions associated with each sponsored content item, and generates a likelihood, a publisher likelihood 520 score, that the benchmark publisher user set 400 will perform a conversion action, or otherwise interact with, the sponsored content item based on the rate of conversion actions. In addition, the publisher quality score generator 270 monitors the rate of conversion actions associated with the same set of sponsored content items when presented to users on the benchmark publisher 310, and generates a likelihood, a benchmark likelihood 510 score, that the benchmark publisher user set 400 will perform conversion actions on the benchmark publisher 310.

The publisher quality score generator 270 uses the publisher likelihood (dividend) and benchmark likelihood 510 (divisor) scores to form a ratio that yields a purchase score (quotient) for a given content publisher 140:

$$\text{purchase score} = \frac{\text{publisher likelihood}}{\text{benchmark likelihood}}$$

The publisher quality score generator 270 applies a weight to this purchase score in generating an overall publisher quality score for a given content publisher 140. The weight is determined based on the rate of user interactions with sponsored content items displayed on the content publisher 140. In one embodiment, this user interaction is measured by the number of "clicks" a sponsored content item receives from the benchmark publisher user set 400. In another embodiment, user interaction may be determined by the online system 100 based on information stored in the user profile stores 200 or action logs 220 of the benchmark publisher user set 400 indicating user exposure to the sponsored content items on the content publisher 140. In the embodiment illustrated in FIG. 5B, the purchase score is weighted using the formula below:

$$\text{weight of purchase score} = 2^{(\log_{10}(\text{number of clicks}) - 6)}$$

Using this formula, the publisher quality score generator 270 assigns a weight to the purchase score determined by the number of clicks received by a sponsored content item featured on a content publisher 140. For example, if a sponsored content item receives one click from a user, the weight assigned to the purchase score is only $2^{-6}$. This could indicate that the content publisher 140 has not generated a threshold volume of user traffic to produce a significant purchase score, or that the sponsored content item itself is limited in user interaction (e.g., due to poor placement of sponsored content slot, unpopular brand, etc.). However, if the sponsored content item receives ten clicks from users, the purchase score weight increases to approximately $2^{-5}$. Similarly, the purchase score weight increases with each multiple of 10 clicks from users (e.g., 1,000,000 clicks yields weight of 1, 10,000,000 clicks yields weight of 2, etc.). By assigning weight to the purchase score in this manner, the publisher quality score generator 270 determines a publisher quality score that is biased toward the purchase score for content publishers 140 that generate a threshold volume of user traffic.

Publisher Quality Score

The publisher quality score is used by the online system 100 to adjust third party value contributions toward the placement of sponsored content items on content publishers 140. Based on the publisher quality score, according to one embodiment, the online system 100 can provide discounts on third party value contributions toward the placement of sponsored content items on content publishers 140 that generate fewer conversion actions than those generated by the benchmark publisher 310 for the same sponsored content items. In another embodiment, the online system 100 can provide discounts on third party value contributions for those user-ad pairs input into the machine learning module 230 that generated a lower likelihood of conversion action than other user-ad pairs. These discounts provide third party systems 130 with less disparity in expected value from sponsored content items placed across content publishers 140. Sponsored content items placed in a sponsored content slots 300 on the benchmark publisher 310 and placed in sponsored content slots 300 on a content publisher 140 are unlikely to generate the same rate of conversion actions associated with the sponsored content item. For example, the online system 100 uses a publisher quality score to identify that the likelihood of a sponsored content item displayed on a content publisher 140 will generate only 50% of the conversion actions compared to those generated by the benchmark publisher 310 for the same sponsored content item. Resultantly, the online system 100 can provide the third party system 130 a 50% discount on the placement of the sponsored content item on the content publisher 140 to normalize the third party value contribution and maintain expected value. In this way, the rate of conversion actions associated with a sponsored content item displayed within the benchmark publisher 310 serves as a baseline efficacy for the rate of conversion actions produced by content publishers 140 external to the online system 100.

The publisher quality score is a composite of the audience score, the purchase score, and their respective weights. The audience score represents a likelihood for a subset of users to perform conversion actions on a content publisher 140 that receives less than a threshold volume of user traffic to observe a rate of conversion actions (e.g., a recently released application); the purchase score represents a likelihood for users to perform conversion actions on a content publisher 140 that generates user traffic greater than the threshold volume. These scores contribute to the publisher quality score as shown below:

publisher quality score=(weight of purchase score)
(purchase score)+(1−weight of purchase score)
(audience score)

As shown in the formula, the audience score and purchase score work in tandem to produce the publisher quality score. For example, a recently released application (e.g., content publisher 140) that has not yet drawn 100 users does not provide a large enough sample set to determine how users of the application behave, or otherwise interact, with sponsored content items featured on the application. As a result, the publisher quality score generated for the application would reflect a predominance of an audience score rather than a combination of both audience and purchase scores. However, if the application becomes popular and begins to draw additional users, the publisher quality score generator 270 can monitor behavior of the additional users on the application and the publisher quality score becomes more biased toward the purchase score.

IV. Publisher Quality Score Process

Figure 6:
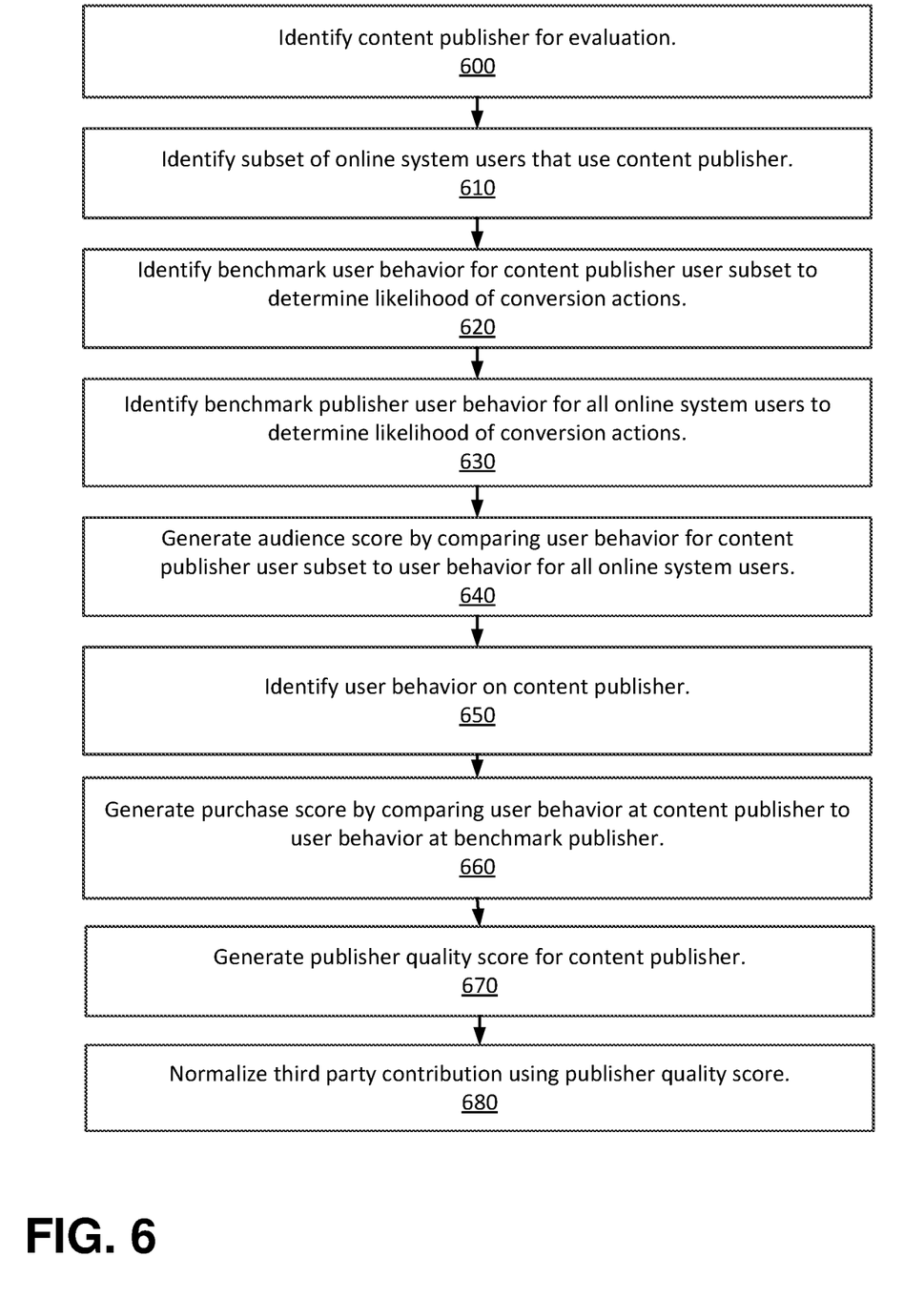
FIG. 6 is a flowchart illustrating a process for generating a publisher quality score for a given publisher according to one embodiment.

FIG. 6 is a flowchart illustrating a process for generating a publisher quality score for a given content publisher 140 according to one embodiment. In the embodiment illustrated in FIG. 6, the publisher quality score generator 270 identifies 600 a content publisher for evaluation. In addition, the publisher quality score generator 270 identifies 610 a subset of online system 100 users that use the identified content publisher (e.g., content publisher user subset 410), and identifies 620 their user behavior (e.g., clicking, performing conversion actions, making purchases, and the like) with sponsored content items on the benchmark publisher 310. The publisher quality score generator 270 uses the identified user behavior on the benchmark publisher 310 to determine a likelihood that the content publisher user subset 410 will perform conversion actions on the content publisher 140 as well (e.g., likelihood of conversion action 500). The publisher quality score generator 270 also identifies 630 benchmark publisher user set 400 behavior to determine a likelihood that this set of users will perform conversion actions on the benchmark publisher 310. The publisher quality score generator 270 generates 640 an audience score by comparing the identified user behavior for the content publisher user subset 410 to the identified user behavior for the benchmark publisher user set 400. If the content publisher 140 has generated a threshold volume of user traffic, the publisher quality score generator 270 identifies 650 user behavior on the content publisher 140 to determine a likelihood (publisher likelihood 520) that the benchmark publisher user set 400 will perform conversion actions on the content publisher 140. The publisher quality score generator 270 generates 660 a purchase score by comparing the identified user behavior on the content publisher 140 to the identified user behavior on the benchmark publisher 310. The audience score and the purchase score are used to generate 670 a publisher quality score for the content publisher 140, and this score is used to normalize 680 third party value contributions toward the placement of sponsored content items on the content publisher 140.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   identifying, at an online system, a benchmark likelihood of a conversion action associated with a sponsored content item when displayed to users viewing content on a benchmark publisher for a set of users of the benchmark publisher, the benchmark likelihood based on previous actions of the set of users at the benchmark publisher;
   determining an audience score for a content publisher based on a subset of users, of the set of users, that access content of the content publisher, the audience score based on a ratio of a likelihood of conversion action of the subset of users of the set of users when the sponsored content item is displayed to users viewing the sponsored content item on the benchmark publisher compared to the benchmark likelihood;
   determining a purchase score for the content publisher based on a publisher likelihood of a conversion action associated with the sponsored content item when displayed to users viewing content on the content publisher for the set of users of the benchmark publisher, the purchase score based on a ratio of the publisher likelihood compared to the benchmark likelihood;
   determining a combination weighting associated with the audience score and purchase score, wherein the combination weighting is determined by a quantity of user interaction at the content publisher;
   generating a publisher quality score for the content publisher, wherein the publisher quality score is a combination of the audience score and the purchase score according to the combination weighting associated with the audience score and purchase score;
   normalizing a third party value contribution based on the publisher quality score;
   receiving, at the online system, a request from the content publisher for a content item for display in a content slot of a plurality of content slots within a webpage of the content publisher;
   evaluating placement of the sponsored content item in the content slot on the content publisher based on the normalized third party value contribution; and
   providing the content item for display in the content slot within the webpage of the content publisher.

2. The computer-implemented method of claim 1, wherein the benchmark publisher is an online system.

3. The computer-implemented method of claim 1, wherein the previous actions of the set of users at the benchmark publisher comprise application installs, post-install purchases, and clicking sponsored content items when displayed on the benchmark publisher.

4. The computer-implemented method of claim 1, wherein the user interaction at the content publisher comprises clicking the sponsored content item when displayed on the content publisher.

5. The computer-implemented method of claim 1, wherein normalizing the third party value contribution comprises adjusting a bid amount for the placement of the sponsored content item in the content slot on the content publisher based on the publisher quality score.

6. The computer-implemented method of claim 5, wherein the publisher quality score is a bid multiplier applied to the bid amount, the bid multiplier adjusting the bid amount for the placement of the sponsored content item.

7. The computer-implemented method of claim 1, wherein the conversion action associated with the sponsored content item comprises application installs and post-install purchases.

8. The computer-implemented method of claim 1, wherein the publisher quality score is modified based on a modified combination weighting.

9. The computer-implemented method of claim 8, wherein the combination weighting associated with the audience score is greater than the combination weighting associated with the purchase score for content publishers that generate less than a threshold volume of user traffic.

10. The computer-implemented method of claim 1, wherein the audience score and purchase score are determined by a machine learning model, the machine learning model receiving as input a user-ad pair and generating as output a likelihood of a conversion action on a particular sponsored content item for each particular user of, both, the set of users and the subset of users.

11. A non-transitory computer readable storage medium having instructions encoded thereon that, when executed by a processor, cause the processor to perform the steps including:
identifying, at an online system, a benchmark likelihood of a conversion action associated with a sponsored content item when displayed to users viewing content on a benchmark publisher for a set of users of the benchmark publisher, the benchmark likelihood based on previous actions of the set of users at the benchmark publisher;
determining an audience score for a content publisher based on a subset of users, of the set of users, that access content of the content publisher, the audience score based on a ratio of a likelihood of conversion action of the subset of users of the set of users when the sponsored content item is displayed to users viewing the sponsored content item on the benchmark publisher compared to the benchmark likelihood;
determining a purchase score for the content publisher based on a publisher likelihood of a conversion action associated with the sponsored content item when displayed to users viewing content on the content publisher for the set of users of the benchmark publisher, the purchase score based on a ratio of the publisher likelihood compared to the benchmark likelihood;
determining a combination weighting associated with the audience score and purchase score, wherein the combination weighting is determined by a quantity of user interaction at the content publisher;
generating a publisher quality score for the content publisher, wherein the publisher quality score is a composite of the audience score, the purchase score, and the combination weighting associated with the audience score and purchase score;
normalizing a third party value contribution based on the publisher quality score;
receiving, at the online system, a request from the content publisher for a content item for display in a content slot of a plurality of content slots within a webpage of the content publisher;
evaluating placement of the sponsored content item in the content slot on the content publisher based on the normalized third party value contribution; and
providing the content item for display in the content slot within the webpage of the content publisher.

12. The non-transitory computer readable storage medium of claim 11, wherein the benchmark publisher is an online system.

13. The non-transitory computer readable storage medium of claim 11, wherein the previous actions of the set of users at the benchmark publisher comprise application installs, post-install purchases, and clicking sponsored content items when displayed on the benchmark publisher.

14. The non-transitory computer readable storage medium of claim 11, wherein the user interaction at the content publisher comprises clicking the sponsored content item when displayed on the content publisher.

15. The non-transitory computer readable storage medium of claim 11, wherein normalizing the third party value contribution comprises adjusting a bid amount for the placement of the sponsored content item in the content slot on the content publisher based on the publisher quality score.

16. The non-transitory computer readable storage medium of claim 15, wherein the publisher quality score is a bid multiplier applied to the bid amount, the bid multiplier adjusting the bid amount for the placement of the sponsored content item.

17. The non-transitory computer readable storage medium of claim 11, wherein the conversion action associated with the sponsored content item comprises application installs and post-install purchases.

18. The non-transitory computer readable storage medium of claim 11, wherein the publisher quality score is modified based on a modified combination weighting.

19. The non-transitory computer readable storage medium of claim 18, wherein the combination weighting associated with the audience score is greater than the combination weighting associated with the purchase score for content publishers that generate less than a threshold volume of user traffic.

20. The non-transitory computer readable storage medium of claim 18, wherein the combination weighting associated with the purchase score is greater than the combination weighting associated with the audience score for content publishers that generate greater than a threshold volume of user traffic.

* * * * *